United States Patent [19]
Celli

[11] Patent Number: 5,020,098
[45] Date of Patent: May 28, 1991

[54] TELEPHONE CONFERENCING ARRANGEMENT

[75] Inventor: John R. Celli, Long Branch, N.J.

[73] Assignee: AT&T Bell Laboratories, Murray Hill, N.J.

[21] Appl. No.: 431,067

[22] Filed: Nov. 3, 1989

[51] Int. Cl.$^5$ .............................................. H04M 3/56
[52] U.S. Cl. .................................... 379/202; 379/206; 381/1; 370/62
[58] Field of Search ............... 379/202, 203, 204, 205, 379/206, 158; 381/1, 2; 370/110.1, 37, 62

[56] References Cited

U.S. PATENT DOCUMENTS

| | | | |
|---|---|---|---|
| 4,581,758 | 4/1986 | Coker et al. | 381/56 |
| 4,787,085 | 11/1988 | Soto et al. | 370/101.1 |
| 4,815,132 | 3/1989 | Minami | 381/1 |

OTHER PUBLICATIONS

Appendiz A. CCITT Recommendation H.221, *Frame Structure for a 64 KBIT/S Channel in Audiovisual Teleservices*, pp. A-1 to A-17 and B-1 to B-13.
Recommendation G.722: *7 kHz Audio-Coding Within 64 KBIT/S*, pp. 231 to 318.

*Primary Examiner*—James L. Dwyer
*Attorney, Agent, or Firm*—Samuel R. Williamson

[57] ABSTRACT

A high-fidelity audio telephone conferencing arrangement which provides talker position information is economically provided between telephone stations over a single standard digital telephone channel. Digitized high-fidelity audio is combined with digitized phase information, derived from talker position detecting circuitry in a local telephone station, and transmitted over the telephone channel to one or more remote telephone stations. A receiver in each remote station decodes the digital information and provides the high-fidelity audio signal to multiple spatially separated acoustic output devices. The digitized pulse information controls "panning" of the audio signal among the acoustic output devices. By varying the level of audio signal flowing to each acoustic device, the position of the talker can be created in a specific position in the remote listener's sound field and the talker's identity thereby more easily determined. In addition, talker location information may be shared among multiple telephone stations participating in a telephone conference. Information as to the location of the talker along with the position of the talker is provided to each remotely located telephone station. The location of the talker is represented by the audio signal occurring in a designated general area of the remote listener's sound field and the position of the talker is represented by the creation of the audio signal in a specific position in this general area.

18 Claims, 3 Drawing Sheets

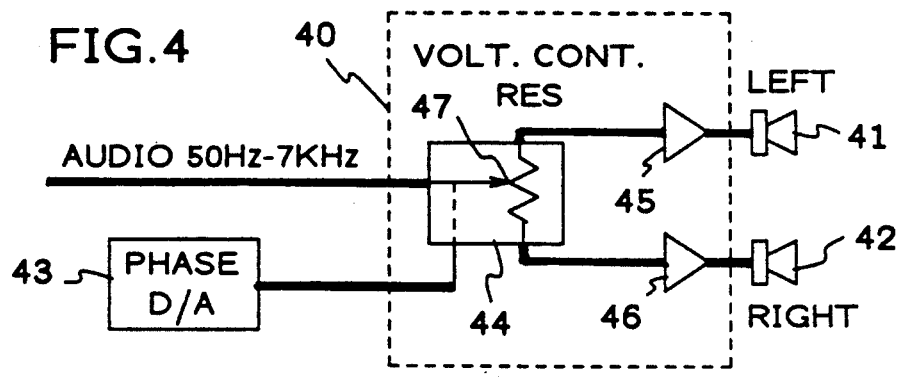
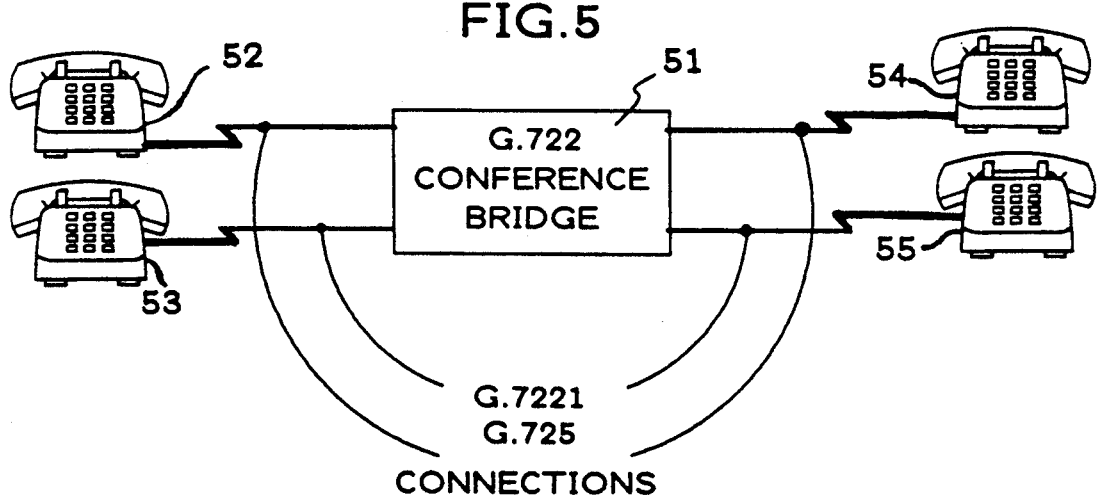
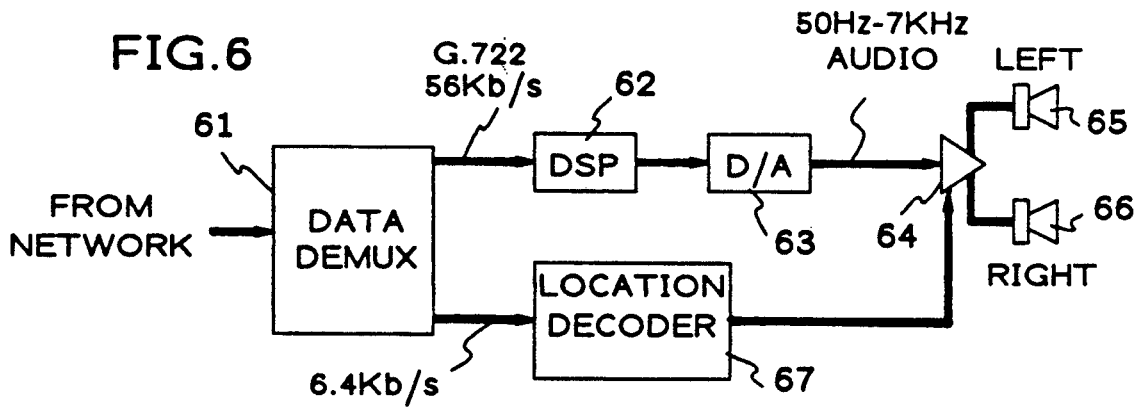

TELEPHONE CONFERENCING ARRANGEMENT

BACKGROUND OF THE INVENTION

1. Technical Field

This invention relates to telephone conferencing arrangements and more particularly, to arrangements for identifying locations and directions of remote sound sources.

2. Description of the Prior Art

In current telephone conferencing arrangements, multiple parties participating at a telephone station receive only audio information from other parties participating at one or more remote telephone stations. No information is provided as to the remote location of a participant who is speaking or the identity of that participant. This limitation is present in existing analog and digital network telephone conferencing arrangements.

With digital networks, however, methods are now available that allow simultaneous transmission of both high quality telephony and data at a moderate speed. These methods are set forth in CCITT Recommendations G.722, G.725 and H.221 which allow for transmission of analog signals with a 7 kHz bandwidth along with optional data at rates at 6.4 or 14.4 kilobits per second over a digital channel. Such a digital channel currently supports only digitized 3 kHz audio signals (Recommendation CCITT G.711). The optional data provided over this digital channel is typically that which is used for communicating digital information between personal computers or facsimile machines.

A stereo signal may be used to convey information as to which participant in a telephone conference call is speaking. This generally requires employing a separate channel for both a left-direction signal and for a right-direction signal. The requirement of the two telephone channels, however, makes this both a cumbersome and expensive option.

An alternative to using two telephone channels for transmitting the stereo signal is to employ one of known signal processing schemes to reduce the digital bandwidth of the encoded signal. Typical of this type of signal processing is a perceptual entropy-based coder wherein a wide-bandwidth analog signal is digitized and encoded into a digital stream whose bandwidth is much less than that of the unprocessed digitized signal. This method, or a similar method, could be used to encode the stereo signals into a lower bit rate digital stream which could then be transmitted over a single digital channel of the digital network. The hardware and/or software to perform this type of encoding, however, is complex and expensive.

While the above methods employing a stereo signal can convey information as to which participant in a telephone conference call is speaking, they do not allow both high quality telephony and speaker location information to be economically conveyed over a single digital telephone channel.

SUMMARY OF THE INVENTION

In accordance with the present invention, a cost effective telephone conferencing arrangement allows the communication of high quality telephony and information as to which one of multiple participants is speaking in a conference call, both over a standard digital telephone channel.

Digital networking and audio encoding methods are illustratively employed to provide speaker position information along with high fidelity audio signal information. In one illustrative arrangement, audio and phase signals obtained from a directional microphone at a telephone station location are applied to audio and phase digitizers whose digital bit streams are encoded for transmission over a standard digital network. The phase signals provide speaker position information and are indicative of which participant in the telephone conference is then speaking. The bit streams are received at other telephone stations connected to the network and participating in the telephone conference. These bit stream are decoded by these telephone stations into high-fidelity audio and phase information signals. The phase information signal is used to "place" the high fidelity audio signal in a sound field created by multiple spatially separated acoustic output devices.

In an alternative illustrative arrangement, wherein three or more telephone stations are involved in the telephone conference, both speaker position information and conference location information may be provided to each telephone station. The conference location information identifies a location wherein a participant in the telephone conference is actively speaking. The location information is derived by a conference bridge interconnecting the stations while the speaker position information is timely provided to the conference bridge by the appropriate telephone station. The conference bridge combines the phase information received from the telephone stations with the conference location information in such a manner to form a composite phase-location signal. This signal is transmitted to each telephone station participating in the conference. In response to receipt of this signal, each telephone station positions the audio signal of a remotely located participant into the local listener's sound field according to that participant's location and the position of the participant at that location. Other participants in the conference thus are able to know both the location of the person speaking and the position of that person at that location.

BRIEF DESCRIPTION OF THE DRAWING

This invention and its moderate of operation will be more clearly understood from the following detailed description when read with the appended drawing in which:

FIG. 4 shows a circuit for decoding phase signal information provided to a station set in accordance with the invention;

FIG. 5 shows a conferencing arrangement comprising a conference bridge for providing location information and a plurality of telephone stations for providing speaker position information in accordance with the invention; and FIG. 6 shows an arrangement for decoding the location information and the speaker position information provided by the conference bridge of FIG. 5.

Throughout the drawing, the same elements when shown in more than one FIGURE are designated by the same reference numerals.

DETAILED DESCRIPTION

Figure 1:
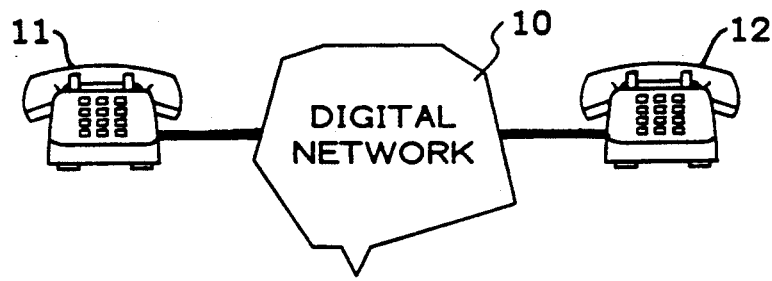
FIG. 1 is a simplified illustration of a digital network interconnecting a pair of telephone stations employing the invention.

Referring to FIG. 1, there is shown a digital network 10 interconnecting digital telephones 11 and 12 and providing a communications link therebetween. Voice information is digitized and passed as a bit stream between the two telephones via a digital connection provided by the digital network. A digital network in which the invention may be employed is the Integrated Services Digital Network (ISDN), although other digital networks are available and the invention also may be suitably employed therein. In the ISDN network, voice information typically has been encoded using a standard such as CCITT Recommendation G.711 Pulse Code Modulation (PCM) for producing a digital output stream of typically 56 or 64 kilobits per second (kb/s). This allowed an analog transmission bandwidth of 300 Hz to 3,200 Hz between the two telephone stations. Presently, the encoding standard CCITT Recommendation G.722 digitizes analog signals having a bandwidth of 50 Hz to 7,000 Hz and transmits the digital bit streams corresponding to these signals over the same digital network. In this standard, a higher fidelity sound is achieved over the same bit-rate digital connection as was previously used for Recommendation G.711.

Figure 2:
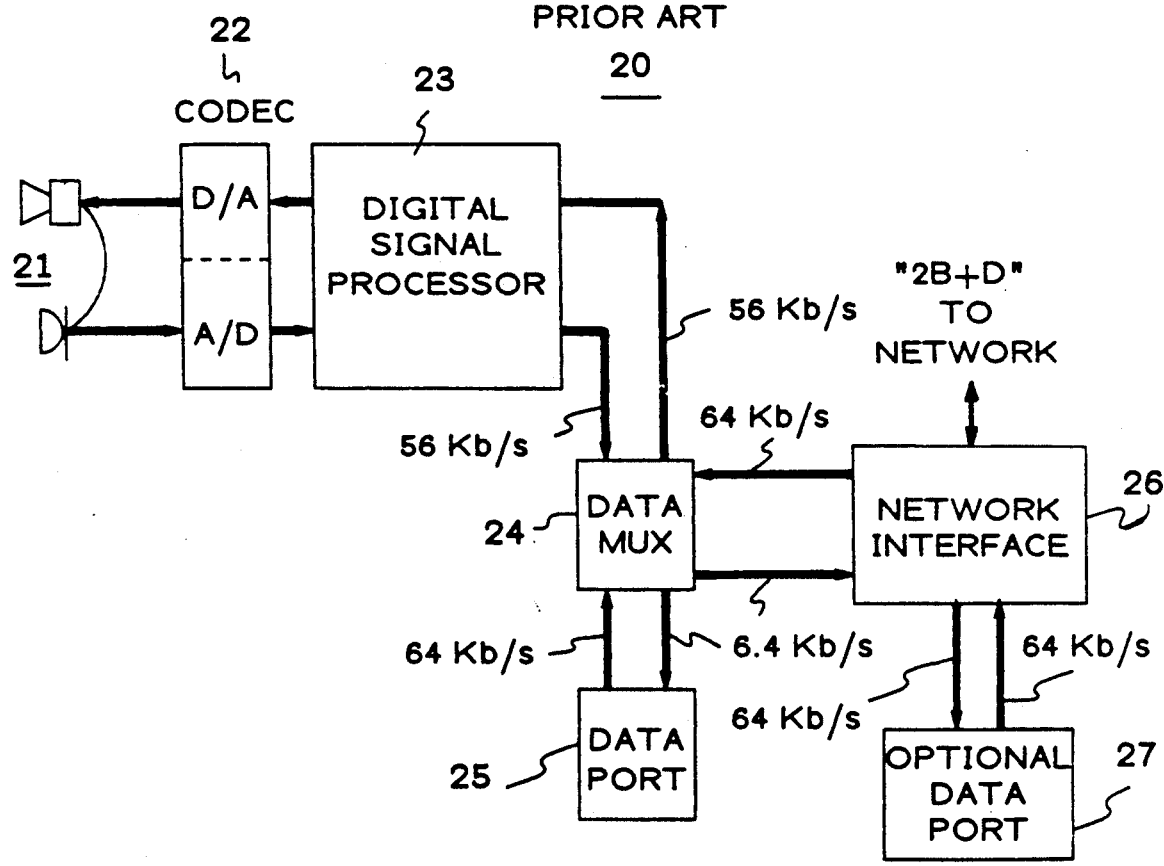
FIG. 2 shows a prior art telephone station.

With reference to FIG. 2, there is shown a prior art telephone which performs both CCITT Recommendations G.711 and G.722. Acoustic signals are received and transmitted by a handset 21 to a coder-decoder (CODEC) 22 which provides a digital interface to a digital signal processor (DSP) 23. A data multiplexer 24 combines the output of the DSP 23 and an external signal provided to a data port 25 for coupling to the network interface 26. The manner in which this is accomplished is specified in CCITT Recommendations H.221 and G.725. As shown in FIG. 2, the DSP 23 provides digitized voice information typically at a 56 kb/s rate to the data muliplexer 24. The data port 25 provides a digital interface to a user data terminal (not shown) for coupling data at a 6.4 kb/s rate into the data multiplexer 24. These two digital bit streams are combined into a 64 kb/s rate bit stream and applied to the network interface 26.

The network interface 26 provides the connection to the digital network 10 depicted in FIG. 1. This is provided in ISDN, for example, via a "2B+D" connection. In this connection there are two B channels and one D channel. Either B channel provides 64 kb/s connectivity between telephones, while the D channel provides call routing information. The second B channel is optional and is available for other uses such as high speed data transfer through an optional data port 27.

Figure 3:
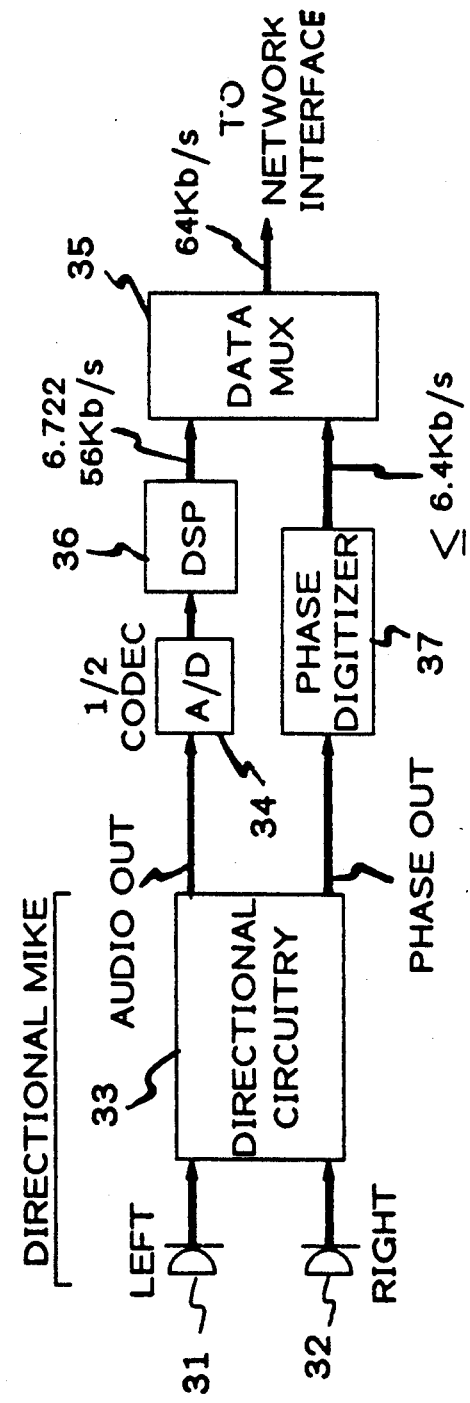
FIG. 3 shows a block diagram of a telephone station which provides high quality telephony and speaker position information in accordance with the invention.
Figure 3:
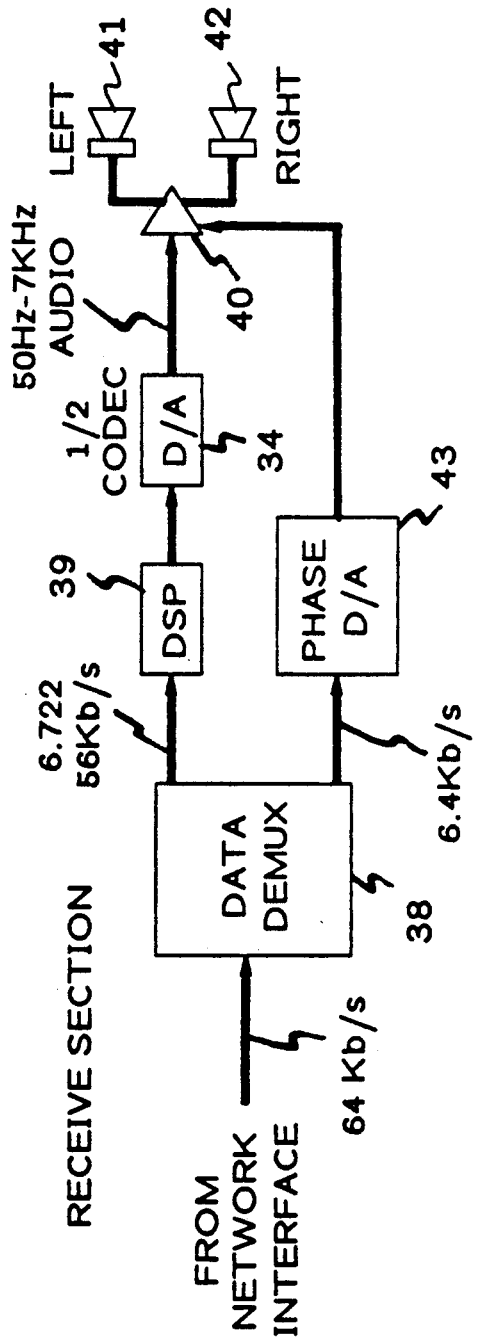

Referring next to FIG. 3, there is shown in accordance with the invention, a transmit and a receive section of a telephone station for providing a high quality directional telephone conferencing arrangement. The transmit section of the station comprises a directional microphone arrangement providing both an audio output signal and a phase localization signal. These two signal are derived from, for example, two or more spatially separated microphones 31 and 32 and directional circuit 33 which provides the audio and phase signals. An arrangement suitable for employing as directional circuitry 33 is described in U.S. Pat. No. 4,581,758 issued to C. H. Coker, et al. on April 8, 1986, this patent and this application being commonly assigned to the same assignee.

The audio output signal from directional circuitry 33 is provided to an analog-to-digital section of a CODEC 34. From CODEC 34, this signal is coupled to a data multiplexer 35 via the DSP 36 which performs CCITT Recommendation G.722 encoding of the signal. The phase output signal is provided to a phase digitizer 37 wherein the analog phase signal is converted to a digital bit stream of typically 6.4 kb/s or less. This bit stream could extend up to a maximum of 14.4 kb/s, however, if a lower-quality 48-kb/s audio signal is acceptable for use in the telephone conference. The use of a lower-quality audio signal allows the combining of both phase information and data from an optional user-data port into a single digital stream with a bandwith of 14.4 kb/s or less. From the phase digitizer 37, the digital bit stream is coupled to the data muliplexer 35 which combines this stream with the digitized audio output signal from the DSP 36 to form a 64 kb/s data stream. This 64 kb/s data stream is applied to the network interface for transmission over the digital network.

A receive section of the telephone station comprises a data de-multiplexer 38 which receives a 64 kb/s bit data stream from the network interface. This de-multiplexer provides two digital bit-stream outputs. The first bit stream consists of a 56 kb/s digitized audio signal and the second consists of a 6.4 kb/s digitized phase signal. Alternatively, as described in the transmit section, a lower-quality 48-kb/s audio signal can be utilized thus allowing 14.4 kb/s for both phase information and optional user data. The digitized audio signal is applied to DSP 39 which performs CCITT Recommendation G.722 decoding of the signal and applies the decoded output to the digital-to-analog converter section of CODEC 34. The analog output of CODEC 34 is then applied to an audio panning amplifier 40, described in detail later herein, which drives at least two acoustic output devices illustratively shown as loudspeakers 41 and 42. It is to be understood that additional acoustic output devices may be employed to more accurately define the position of the audio signal in a sound field. The digitized phase signal from the data demultiplexer 38 is applied to a phase digital-to-analog converter 43 which, in turn, controls the panning amplifier 40.

Referring now to FIG. 4, there is shown in greater detail circuitry suitable for use as the audio panning amplifier 40 shown in FIG. 3, although it is understood that other realizations are possible and anticipated. This circuitry includes a voltage controlled resistance 44 and amplifiers 45 and 46. An audio output signal from the digital-to-analog converter in CODEC 34 provides a first input to the voltage controlled resistance 44. The control voltage for the voltage controlled resistance 44 is provided by the output of the phase digital-to-analog converter 43. This control voltage determines the position of a wiper 47 and hence the amount of signal proportionately flowing to amplifiers 45 and 46 and their respectively associated loudspeakers 41 and 42. By varying the amounts of signal flowing to loudspeakers 41 and 42, the position of a remotely located person can be recreated in the listener's sound field and thereby his or her identity may be more easily determined.

Referring next to FIG. 5, there is shown a conferencing arrangement comprising a conference bridge 51 and multiple telephone stations 52 through 55, usually at separate remote locations. The conference bridge 51 provides a digitized "conference" audio output in accordance with standard conferencing algorithms available in the art. Additionally, circuitry in the bridge generates a signal in a phase channel, in the manner of the directional circuitry 33 described earlier herein and shown in FIG. 3, reflective of the one or more of the multiple locations where a participant is actively speaking. Both the digitized conference audio and phase locations signal are combined and transmitted via a digital network to the multiple telephone stations 52 through 55 in a manner similar to that described in the transmit section of a telephone station described earlier herein and depicted in FIG. 3.

With regard to FIG. 6, there is shown a receive section of a telephone station for decoding the combined digitized audio and phase location signal generated by the conference bridge shown in FIG. 5. Similar to the receive section of the telephone station described in FIG. 3, this receive section comprises a data de-multiplexer 61 which receives a 64 kb/s bit stream from a network interface (not shown) and provides two digital bit/stream outputs. The first output consists of a 56 kb/s digitized audio signal and the second output consists of a 6.4 kb/s digitized phase location signal. The digitized audio signal is applied to the DSP 62 which performs CCITT Recommendation G.722 decoding of the signal and applies the decoded output to a digital-to-analog converter 63. The analog output of the digital-to-analog converter 63 is applied to a "pan" amplifier 64 which drives multiple acoustic output devices illustratively shown as loudspeaker 65 and 66. The digitized phase location signal is applied to location decoder 67 which comprises a digital-to-analog converter. The output of the location decoder 67 controls the panning amplifier 64 such that signals from different conferencing locations (e.g. telephones 52 through 55) appear at different positions in a conference participant's sound field.

In an alternative conferencing arrangement wherein there or more telephone stations are involved in the telephone conference, both speaker position information and conference location information may be provided in the telephone conference. The conference location information identifies a location wherein a participant in the telephone conference is actively speaking.

The conference location information is derived by a conference bridge interconnecting the stations while the speaker position information is timely provided to the conference bridge by the appropriate telephone station. The conference bridge combines phase information, reflective of the position information received from the individual telephone stations, with the conference location information in such a manner to form a composite phase-location signal. This signal is transmitted to each telephone station participating in the conference. In response to receipt of this signal, each telephone station positions the audio signal of a remotely located participant into the local listener's sound field according to the participant's location and the position of the participant at that location. In this alternative arrangement, this is achieved by providing a panoramic sound field for the local listener.

Such an alternative arrangement is easily achieved in a telephone conference with up to five telephone stations participating in the conference and wherein multiple parties are located at each one of the stations. In such a conference, by way of example, acoustic sounding devices are affixed to each one of up to four walls or panels enclosing each conference room containing a telephone station. The acoustic sounding devices for each wall or surface generate a limited area sound field representative of a predetermined conference location and speech sounds emanating from selected positions in the vicinity of this surface represent the conference participants at the conference location. These limited area sound fields are combined around the listener to form the indicated panoramic sound field. From the generation of this panoramic sound field, other participants in the conference thus are able to know both the location of the person speaking and the position of that person at a location thereby aiding in determining the identity of that person.

Various other modifications of this invention are contemplated and may obviously be restored to by those skilled in the art without departing from the spirit and scope of the invention as hereinafter defined by the appended claims.

I claim:

1. A telephone conferencing arrangement for communicating speech signals representative of speech sounds between telephone stations over a digital channel, the arrangement comprising:

means for measuring speech sounds originating at a first telephone station, the measuring means providing output speech signals representing the speech sounds for transmission over the digital channel;

means for determining the direction of origin of the speech sounds originating at the first telephone station;

means for encoding a phase localization signal reflective of the direction of origin of the speech sounds, the phase localization signal being transmitted to a second telephone station with the speech signals over the digital channel; and means in the second telephone station for creating in a sound field directional speech sounds corresponding to the direction of origin of the speech sounds at the first telephone station, the direction speech sounds being created in response to receipt of the speech signals and the phase localization signal.

2. A telephone conferencing arrangement as in claim 1 wherein the means for creating the directional speech sounds comprises a panning amplifier, the panning amplifier being connected to at least two acoustic output devices for emanating the directional speech sounds.

3. A telephone conferencing arrangement for communicating speech signals among multiple telephone stations, the arrangement comprising:

means for determining a station of origin for speech signals originating in the conference arrangement;

means for encoding phase signal information reflective of the station of origin of the speech signals, the phase signal information and the speech signals being transmitted to each of the other multiple telephone stations over a respectively associated digital channel; and means in the multiple telephone stations for creating in a sound field directional speech sounds corresponding to a predetermined location for the station of origin of the speech signals, the directional speech sounds being created in response to receipt of both the speech signals and the phase signal information.

4. A telephone conferencing arrangement as in claim 3 further comprising a conference bridge for interconnecting the multiple telephone stations.

5. A telephone conferencing arrangement as in claim 4 wherein the means for creating the directional speech sounds comprises a panning amplifier, the panning amplifier being connected to at least two acoustic output devices for emanating the directional speech sounds.

6. A telephone conferencing arrangement for communicating speech signals among multiple telephone stations, the speech signals corresponding to multiple speech sounds at each of the multiple telephone stations, the arrangement comprising;
   means for determining a station of origin and the direction of origin at that station for speech sounds originating at one of the multiple telephone stations;
   means for encoding phase signal information reflective of both the station of origin and the direction of origin of the speech sounds at the station of origin, the phase signal information and the speech signals being transmitted to each of the other multiple telephone stations over a respectively associated digital channel; and
   means in the multiple telephone stations for creating directional speech sounds in multiple sound fields, each sound field corresponding to a predetermined location for the station of origin of the speech signals, and the speech sounds in each sound field corresponding to the direction of origin of the speech sounds at the station of origin, the directional speech sounds being created in response to receipt of both the speech signals and the phase signal information.

7. A telephone conferencing arrangement as in claim 6 further comprising a conference bridge for interconnecting the multiple telephone stations.

8. A telephone conferencing arrangement as in claim 1 wherein the means for creating the directional speech sounds comprises a panning amplifier, the panning amplifier being connected to at least two acoustic output devices for emanating the directional speech sounds.

9. A telephone conferencing arrangement as in claim 8 wherein each sound field is generated by at least two spatially separated acoustic output devices.

10. A method of communicating speech signals representative of speech sounds between telephone stations over a digital channel, the method comprising the steps of:
    measuring speech sounds originating at a first telephone station for providing speech signals representing the speech sounds for transmission over the digital channel;
    determining the direction of origin of the speech sounds originating at the first telephone station;
    encoding a phase localization signal reflective of the direction of origin of the speech sounds, and transmitting the phase localization signal to a second telephone station with the speech signals over the digital channel;
    receiving at the second telephone station the speech signals and the phase localization signal; and
    creating directional speech sounds in a sound field at the second telephone station, the directional speech sounds corresponding to the direction of origin of the speech sounds at the first telephone station.

11. A method of communicating speech signals in accordance with claim 10 wherein the creating step includes a panning amplifier connected to at least two acoustic output devices for emanating the directional speech sounds.

12. A method of communicating speech signals among multiple telephone stations, the method comprising the steps of:
    determining a station of origin for active speech signals;
    encoding phase signal information reflective of the station of origin of the speech signals,
    transmitting the phase signal information and the speech signals to each of the other multiple telephone stations over a respectively associated digital channel; and
    creating in a sound field directional speech sounds at each of the multiple telephone stations, the directional speech sounds corresponding to a predetermined location in the sound field for the station of origin of the speech signals.

13. A method of communicating speech signals in accordance with claim 12 further comprising a conference bridge for interconnecting the multiple telephone stations.

14. A method of communication speech signals in accordance with claim 13 wherein the creating step includes a panning amplifier connected to at least two acoustic output devices for emanating the directional speech sounds.

15. A method of communicating speech signals among multiple telephone stations, the speech signals corresponding to multiple speech sound at each of the multiple telephone stations, the method comprising the steps of:
    determining both a station of origin and the direction of origin at that station for speech sounds originating at one of the multiple telephone stations;
    encoding phase signal information reflective of both the station of origin and the direction of origin of the speech sounds at the station of origin, and transmitting the phase signal information and the speech signals to each of the other multiple telephone stations over a respectively associated digital channel;
    receiving at each of the multiple telephone stations both the speech signals and the phase signal information; and
    creating directional speech sounds in multiple sound fields at each of the multiple telephone stations, each sound field corresponding to a predetermined location for the station of origin of the speech signals, and the speech sounds in each sound field corresponding to the direction of origin of the speech sounds at the station of origin.

16. A method of communicating speech signals in accordance with claim 15 further comprising a conference bridge for interconnecting the multiple telephone stations.

17. A method of communicating speech signals in accordance with claim 16 wherein the creating step includes a panning amplifier connected to at least two acoustic output devices for emanating the directional speech sound.

18. A method of communicating speech signals in accordance with claim 17 wherein each sound field is generated by at least two spatially separated acoustic output devices.

* * * * *